Feb. 9, 1926. 1,571,954
E. B. LAMBERT
FLUID POWER TRANSMITTER
Filed Sept. 25, 1924 4 Sheets-Sheet 1
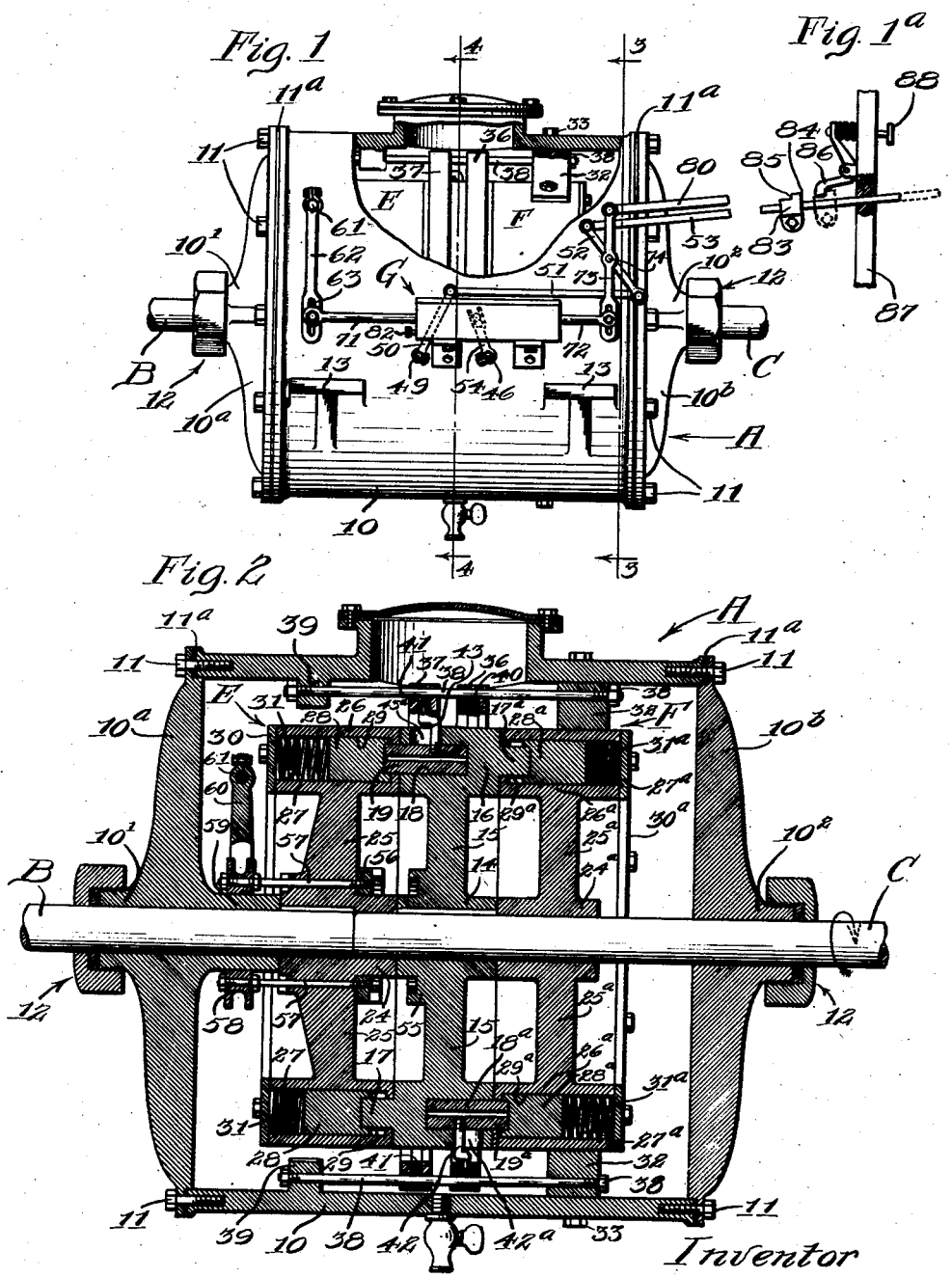
Inventor
Edmund B. Lambert
By Bradbury & Carswell
Attorneys Feb. 9, 1926. 1,571,954
E. B. LAMBERT
FLUID POWER TRANSMITTER
Filed Sept. 25, 1924 4 Sheets-Sheet 2

Inventor
Edmund B. Lambert
By Bradbury + Caswell
Attorneys

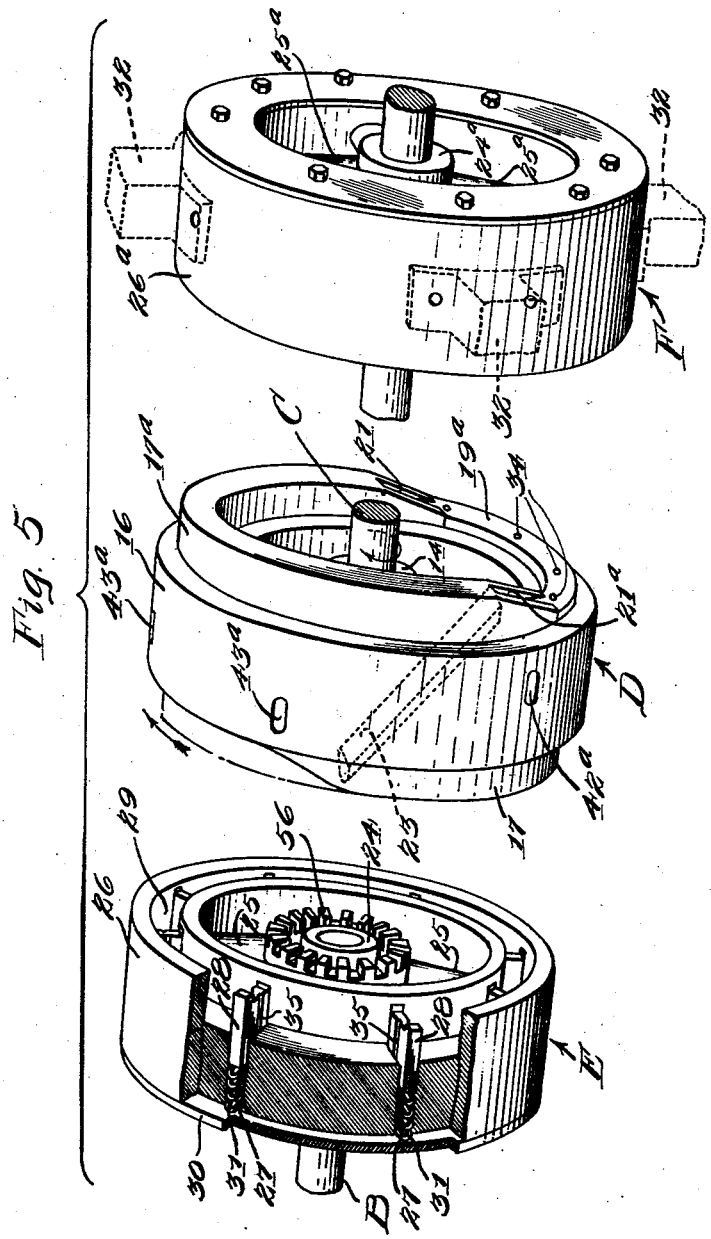

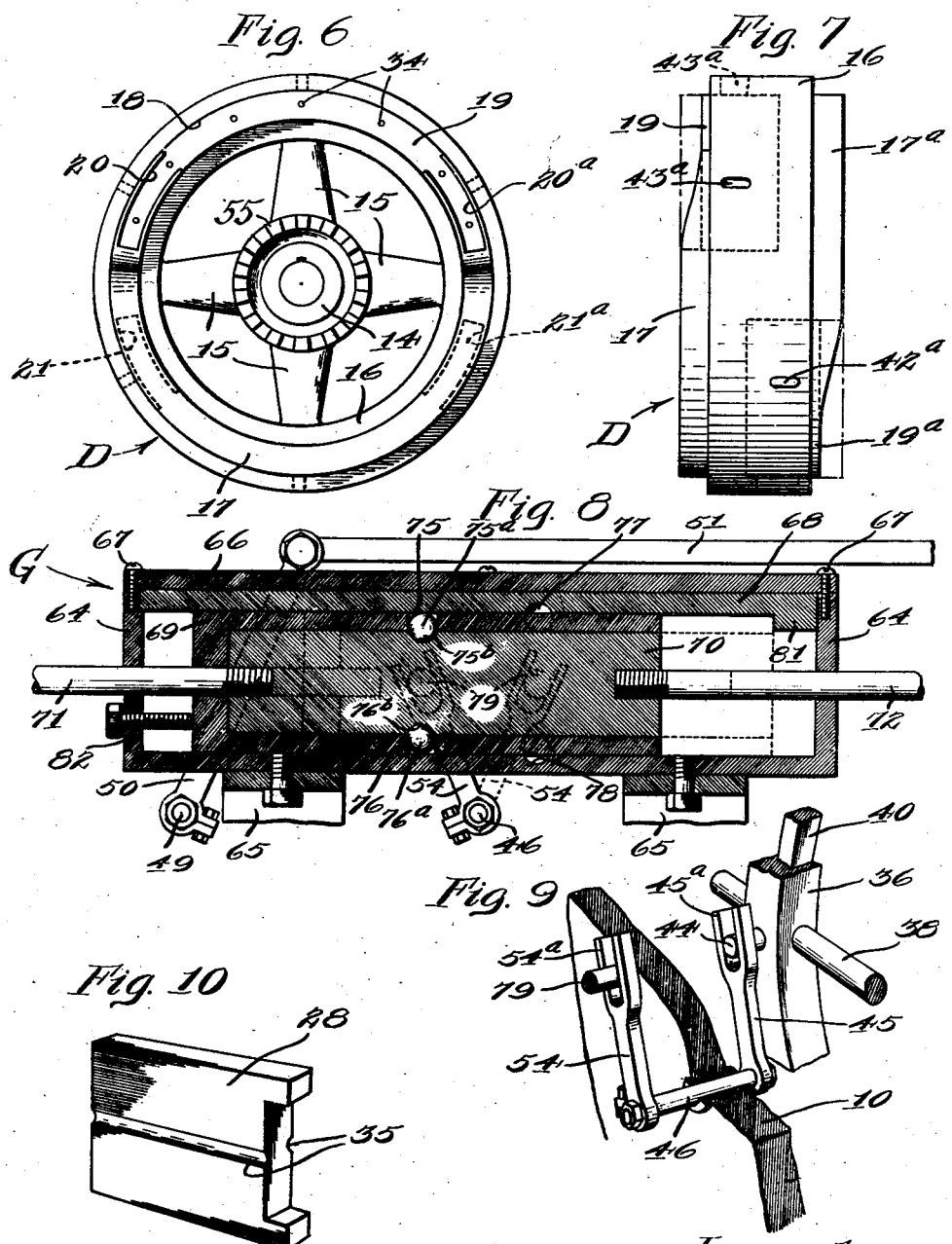

Patented Feb. 9, 1926.                                                         1,571,954

UNITED STATES PATENT OFFICE.

EDMUND B. LAMBERT, OF ST. PAUL, MINNESOTA.

FLUID POWER TRANSMITTER.

Application filed September 25, 1924. Serial No. 739,870.

*To all whom it may concern:*

Be it known that I, EDMUND B. LAMBERT, a citizen of the United States, residing at St. Paul, in the county of Ramsey and State of Minnesota, have invented a new and useful Fluid Power Transmitter, of which the following is a specification.

My invention relates to improvements in fluid power transmitting devices and its object, broadly, is to provide a simple, efficient and durable means for variably transmitting power through the medium of a fluid.

More specifically it is my object to supply a compact device, particularly, though not exclusively, adapted for use in motor driven vehicles, said device being designed to eliminate the use of the conventional clutch, and transmission gears and to supplant therefor a unitary, hydraulic mechanism, capable of effecting an infinite, smooth variation of power and speed within given limits during forward and reverse operations.

A further object of my invention is to supply in a device of the present class, a combination of rotors and a stator co-operating through the medium of a power transmitting fluid transferable from one element to another, said elements embodying means for controlling the transference of fluid to vary the speed of the driven element with respect to the speed of the driving element, said means also serving to trap the fluid against transference and thus form a fluid lock between the driving and driven elements directly connecting the same.

With the foregoing and other objects in view, which will appear in the following description, the invention resides in the novel combination and arrangement of parts and in the details of construction hereinafter described and claimed.

Figure 3:
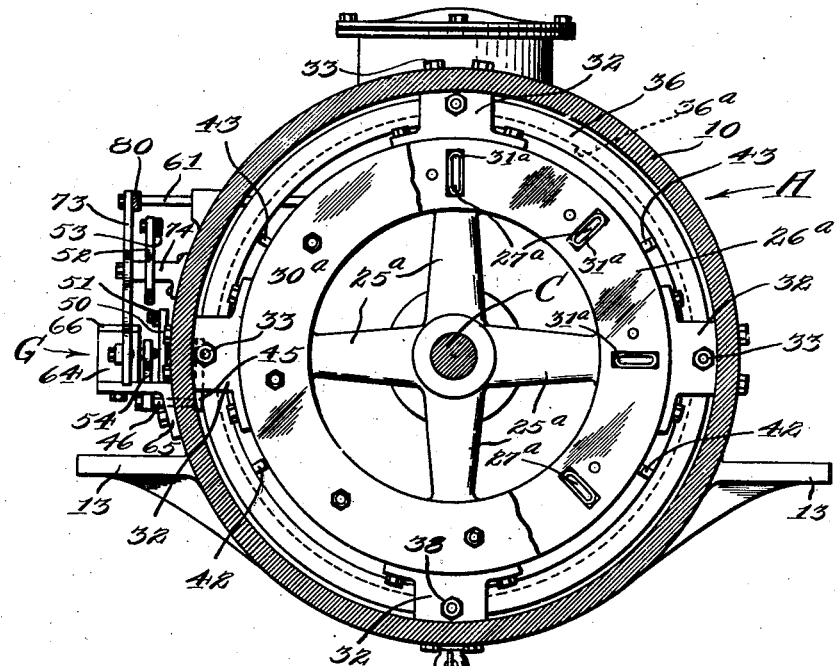
Figure 4:
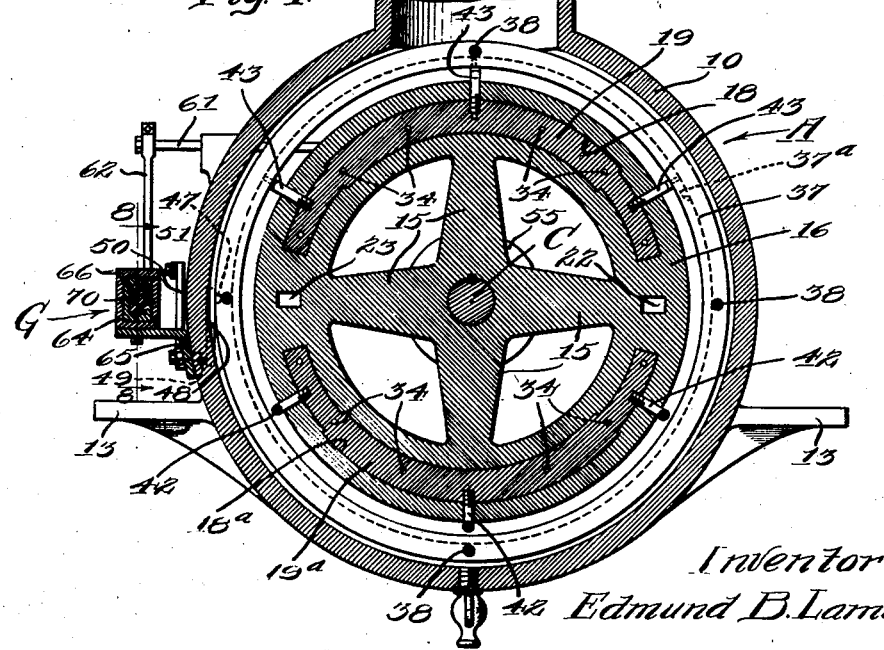

In the drawings, Fig. 1 is a side elevational view of a fluid power transmitter embodying my invention, the housing of the device being broken away to expose working mechanisms otherwise hidden; Fig. 1ᵃ is a detail view of an actuating rod of the device and latching mechanism therefor; Fig. 2 is a central longitudinal, sectional view of the device; Fig. 3 is a transverse sectional view taken on the line 3—3 of Fig. 1; Fig. 4 is a similar sectional view taken on the line 4—4 of Fig. 1; Fig. 5 comprises perspective views of the rotors and stator, said parts being disassociated from their mountings and axially separated for the purpose of disclosing more clearly the structural arrangement thereof; Fig. 6 is an end view of the propelling rotor; Fig. 7 is a side view of said rotor; Fig. 8 is a longitudinal sectional view of the movable filler segment and clutch operating mechanism, said view being taken as on the line 8—8 of Fig. 4; Fig. 9 is a perspective view, in detail, illustrating a portion of the mechanism for operating the shifter rings and Fig. 10 is a perspective view of a blade of the type used in the driven rotor and stator.

Referring to the drawings, it will be observed that my improvement includes a housing A, a pair of aligned shafts B, C arranged axially of the housing and reaching thereinto from opposite ends of said housing, a driving rotor D on the end of the shaft C within the housing, a driven rotor E carried by the inner end of the shaft B at one side of the driving rotor D and a stator F fixed within the housing at the other side of the driving rotor D.

The housing A comprises a cylindrical casing 10 and end plates 10ᵃ, 10ᵇ secured thereto by means of bolts 11, a gasket 11ᵃ being interposed between said end plates and casing to insure against the leakage of fluid with which said housing is filled. The end plates 10ᵃ, 10ᵇ are formed with bearings 10′, 10² for the shafts B, C and are threaded at their outer ends to receive glands 12. Brackets 13 reaching outward from the sides of the casing 10 provide anchoring means for securing the device to a vehicle or other frame.

The driving rotor D, resembling a wheel, comprises a hub 14, spokes 15 and a rim 16, the hub 14 being keyed to the shaft C. On one side of the rim 16 is a segmental protuberance or fixed cam member 17 (Fig. 5) beveled at its ends as shown. In said side of said rim and between the extremities of said cam member 17 is a segmental recess 18 containing a filler segment or shiftable cam member 19 slidable axially of the rotor and movable between retracted position, sheathed within the rim 16 (dotted lines Fig. 7), to extended position (broken lines Fig. 7) filling the gap between the ends of the fixed cam members 17. On the other side of the rim 16 is a fixed cam member 17ᵃ and a filler segment or shiftable cam member 19ᵃ in a recess 18ᵃ in said rim, both members being structurally identical with the similar parts 17, 19 just described, but arranged in diametric opposition to said similar parts. The ends of the segmental recesses 18, 18ª containing the filler segments 19, 19ª are reduced in width at the ends thereof to accommodate the ends of said filler segments 19, 19ª which are correspondingly reduced, said reduced ends of said recesses being continued outward through the beveled ends of the fixed cam members 17, 17ª and forming grooves 20, 20ª in the former and grooves 21, 21ª in the latter. A duct 22 formed in the rim 16 diagonally thereof connects the groove 20 with the groove 21 while a similar duct 23 in said rim connects the groove 20ª with the groove 21ª. The tongue-like reduced ends of the filler segments 19, 19ª move outward and back in said grooves 20, 20ª and 21, 21ª when said segments are extended and retracted. This tongue and groove construction results in complete annular continuity in the bearing surfaces provided by the cam members 17, 19 and 17ª, 19ª without objectionably blocking the passageways through the ducts 22, 23, as will be later understood.

The driven rotor E is also a wheel-like structure. It includes a hub 24 keyed on the shaft B, spokes 25 and a rim 26. Spaced slots 27 formed in the rim 26 slidably receive plate-like blades or gates 28. These slots are cut into the rim from the outer side thereof and are arranged to carry said blades, longitudinally, in parallelism with the axis of the rotor and laterally, in planes intercepting said axis. The inner side of the rim 26 has an annular groove 29 therein cutting the inner ends of the slots 27 between their lateral extremities. This groove receives the adjacent composite protuberance, on the driving rotor D, formed by the cam member 17 and the segment 19 in extended position, said protuberance being proportioned to fill said groove 29, yet permit of free relative rotation of the driving and driven rotors D, E. Confined within each of the blade guiding slots 27 and interposed between its respective blade 28 and an annular backing plate 30, secured against the outer side of the rim 26, is an expansion spring 31. These springs 31 operating upon the blades 28 yieldingly hold the inner ends of said blades 28 against the faces of the cam member 17 and filler segment 19, said inner ends of said blades being recessed to straddle the composite annular protuberance formed on the driving rotor D by said cam member 17 and filler segment 19.

The stator F, including a rim 26ª, spokes 25ª and hub 24ª is centered in the housing A by means of blocks 32 interposed between the rim 26ª and casing 10, said blocks being secured to said rim in any suitable manner and anchored to said casing as by means of bolts 33. The hub 24ª revolubly receives the shaft C and supplies a journal therefor.

The rim 26ª of the stator E is formed and equipped in simulation of the rim 26 of the driven rotor E, reference characters applied to the rim structure of the stator being the same, except for the suffixes "a" as the numerals applied to the rim structure of the rotor E. In this connection it will be noted that the segmental protuberance or fixed cam member 17ª and the filler segment or movable cam member 19ª on the driving rotor D fit and turn in the annular groove 29ª in the stator in the same manner as the similar cam members 17, 19 on said driving rotor D fit and turn in the annular groove 29 in the driven rotor E.

With the foregoing description in mind and assuming that the filler segments are retracted, it will be understood that a chamber is formed in the annular groove 29 of the driven rotor E between the ends of the cam member 17 and that a similar chamber is formed in the annular groove 29ª of the stator F between the ends of the cam member 17ª. These chambers and the ducts 22, 23 in the driving rotor D, which afford communication between said chambers, are filled with oil or other suitable power transmitting fluid. And here, it will be observed that by-pass apertures 34 formed in the filler segments 19, 19ª allow oil to pass from said chambers to the inner portions of the filler segment receiving recesses 18, 18ª or vice versa and thereby permit of the extension and retraction of said filler segments. Further, it will be noted that opposed longitudinal grooves 35 formed medially of the sides of the blades 28, 28ª permit of the unimpeded projection of said blades into their respective grooves 29, 29ª and the ready return of the blades.

In explanation of the operation of the main power transmitting elements thus far set forth, assume that the filler segments 19, 19ª are both fully retracted. In this relation of said segments equal quantities of oil are confined within the chambers in the rotor E and stator F between the ends of the cam members 17, and 17ª. With the driving rotor D, turning clockwise (Fig. 5), the blades 28ª in the stator F and the blades 28 in the driven rotor E follow the bearing surfaces of the cam members 17ª, 19ª and 17, 19. Due to the relative arrangement of the blades 28, 28ª and the cam members 17, 17ª, two of the blades 28 are always found between the ends of the cam member 17 and two of the blades 28ª between the ends of its corresponding cam member 17ª. Projected into the oil chamber in the stator and between the ends of the cam member 17ª, the blades 28ª of the stator drive the oil from said chamber into and through the duct 22 to the oil chamber in the driven rotor between the ends of the cam member 17. Likewise projecting into their respective chamber, the blades 28 of the driven rotor force the oil from said chamber into the duct 23 and back to the chamber in the stator F. Since the two fluid chambers are now of equal capacity, it will be understood that the driving rotor may idle without imparting any appreciable propelling force to the driven rotor E when both of the filler segments 19, 19ª are fully retracted. This ability of the driving rotor to idle suits the device to many different purposes, as will be obvious. The driven rotor E is propelled in the direction of the driving rotor D at any desired speed up to that of the driving rotor by extending the filler segment 19ª more or less, into the fluid chamber in the stator between the ends of the cam member 17ª. Partial projection of the filler segment 19ª reduces the capacity of said chamber. Thus reduced, the blades 28 of the driven rotor E are unable to return the normal flow of fluid to the stator F. This condition obtaining, it will be understood that said driven rotor will be turned in the direction of the driving rotor D, the controlled slippage between the driven rotor and driving rotor depending upon the capacity of the fluid chamber in the stator F and the resultant quantity of fluid permitted to be returned from the fluid chamber in the driven rotor. Reaching fully projected position, the filler segment 19ª fills the fluid chamber in the stator F and arrests the circulation of the fluid. Being trapped in the chamber in the driven rotor E, the fluid therein, cooperating with the rotor blades 28, locks the driven rotor E to the driving rotor D. With the driving rotor D running idle, a partial extension of the filler segment 19 causes the driven rotor E to turn reversely of the driving rotor. This extension of said segment reduces the capacity of the fluid chamber in the driven rotor E. Since the stator F is fixed against rotation and its filler segment 19ª fully retracted, it will be understood that the maximum quantity of fluid will be forced from the fluid chamber in the stator to the now reduced fluid chamber in the driven rotor E. For this reason, the driven rotor E, following the direction of least resistance, turns in opposition to the driving rotor D and at a speed great enough to accommodate the inflow of fluid thereto from the stator F.

Means employed for shifting the filler segments 19 and 19ª into and out of their respective fluid chambers includes a pair of shifter rings 36 and 37 encircling the driving rotor D and slidably mounted upon guide rods 38. These guide rods are disposed longitudinally within the housing A between the blocks 32 and lugs 39 projecting inwardly from the casing 10. Said rings 36 and 37 are grooved at their inner peripheries as at 36ª, 37ª, the groove 36ª forming a way in the ring 36 for an annulus 40 and the groove 37ª forming a way in the ring 37 for a similar annulus 41. Radial link-pins 42 reaching through slots 42ª in the rim 16 of the driving rotor D are fastened at their inner ends to the filler segment 19ª and at their outer ends to the annulus 40. Similar link-pins 43 reaching through similar slots 43ª are fastened at their inner ends to the filler segment 19 and at their outer ends to the annulus 41. The rings 36, 37 are each independently shifted to and fro on the guide rods to extend and retract their respective filler segments 19ª, 19. The ring 36 has a radial stud 44 (Fig. 9) extending from its outer surface and embraced by the forked end 45ª of a shifting lever 45 rising from a rock-shaft 46 reaching through and journaled in the side of the casing 10. The ring 37 also has a stud 47 extending therefrom and embraced by the forked end of a shifting lever 48, which rises from a rock-shaft 49 reaching through and journaled in the side of the casing 10. An arm 50 on the outer end of said latter rock-shaft 49 is connected through a link 51 and lever 52 with a rod 53 which is reciprocated by hand or otherwise to shift the filler segment 19 in the driving rotor D.

While I have illustrated but one shifting lever for each ring 36, 37, it will be understood that duplicates of said levers may be employed and co-ordinated with the levers shown to meet the resistance encountered. The rock-shaft 46, like the rock-shaft 49, is fitted with an arm 54 at its outer end and while this arm might well be rocked back and forth by any simple mechanism to shift the ring 36, I associate said arm 54 with a shifter mechanism G, which has the dual function of rocking the arm 54 and operating a jaw clutch, which is interposed between the driven and driving rotors E, D to relieve said rotors from internal strains that would otherwise occur when the former is turned in unison with the latter by reason of the fluid lock between them.

The jaw clutch includes a fixed toothed member 55 on the hub 14 of the driving rotor D and a movable toothed member 56 slidable on the hub 24 of the driven rotor E. Slide-rods 57 secured at their inner ends to the movable toothed member 56 reach through the hub 24 and connect at their outer ends with an externally grooved collar 58 slidably mounted on a bearing 59 formed integral with the end plate 10ª. A yoke 60 with its branches fitted in the groove in said collar depends from a shaft 61 which traverses the casing 10. Depending from the end of the shaft 61 extending through the casing wall is an arm 62 having a slot 63 at the lower end thereof. The shifter mechanism G, now to be described, co-ordinates the movement of the arm 54 and the arm 62, whereby the jaw clutch members 55, 56 are engaged after the filler segment 19ª is fully extended to create a fluid lock between the rotors D, E and disengaged before the commencement of retraction of said filler segment. Said shifter mechanism G comprises an elongated box-like structure 64 supported on the side of the housing A by means of brackets 65. Referring to Fig. 8 it will be observed that this box-like structure 64 has a cover plate 66 secured in position by means of screws 67, a guide plate 68 immediately beneath said cover plate, a carriage block 69 longitudinally slidable between the guide plate 68 and the bottom of said box structure 64 and a slide block 70 within said carriage block. A rod 71 is threaded at one end in the slide block 70 and connects with the slotted end of the lever arm 62 at its other end. A second horizontal rod 72 is threaded in the opposite end of said slide block and is connected at its other end with the slotted lower extremity of a lever 73 tiltable on a stud 74. The carriage block 69 is provided with apertures 75, 76 at the top and bottom thereof, respectively, caging steel balls 75ª, 76ª. Said balls 75ª, 76ª, held by the guide plate 68 and bottom of the structure 64 seat in concave recesses 75ᵇ, 76ᵇ in the slide block 70 and secure said slide block and carriage block 69 against relative longitudinal movement, said balls being capable of receding into recesses 77, 78 in the guide plate 69 and bottom of the structure 64 to free the carriage block 69 from the slide block 70. A pin 79 carried by the carriage block 69 and reaching through a slot (not shown) in the inner side of the box structure 64 is embraced by the forked end 54ª of the arm 54 on the rock-shaft 46. When the carriage block 69 occupies the position shown in Fig. 8, the balls 75ª, 76ª are seated in the recesses 75ᵇ, 76ᵇ in the slide block 70. When the rod 72 is moved to the right (Fig. 8), as by means of an actuating rod 80 connected with the lever 73, the carriage block 69 and slide block 70 move together until the apertures 75, 76 are brought into position opposite the companion concave recesses 77, 78 in the guide plate 68 and the bottom of the box structure 64. At this point, the movement of the carriage block 69 is arrested by a stop 81 provided on the guide plate 68, the balls 75ª and 76ª being forced into the recesses 77 and 78 by the continued movement of the slide block 70, thereby releasing said slide block from engagement with said carriage block. The movement of the carriage block to position against its stop 81 extends the filler segment 19ª through the medium of the pin 79, arm 54, rock-shaft 46, lever 45, shifter ring 36, annulus 40 and pins 42. The continued movement of said slide block 70 after the movement of said carriage block 69 has been arrested by the stop 81 is sufficient to carry the slidable clutch member 56 into engagement with its companion clutch member 55 through the medium of the rod 71, arm 62, shaft 61, yoke 60 and rods 57. At the beginning of the return thrust of the slide block 70 (movement to the left, Fig. 8), the jaw clutch members are disengaged, following which, the recesses 75ᵇ, 76ᵇ in the slide block receive the balls 75ª, 76ª and again secure the carriage block 69 with respect to said slide block. Continuing the return of the slide block 70, the carriage block 69 is moved with it, the result being that the filler segment 19ª is retracted by the movement of said carriage block. An adjusting screw 82 threaded in the end of the box structure supplies a means for altering the sliding limit of the carriage block 69 and hence varies the limit of retraction of the filler segment 19ª.

From the foregoing it will be understood that the actuating (push-pull) rods 53, 80 control the operation of the device. Set as shown in Fig. 1, the driving rotor idles. Pushing upon the rod 80 starts the driven rotor E in the direction of the driving rotor D, the speed of the former with respect to the latter depending upon the adjustment of said rod 80. Pulling upon the rod 53 starts said driven rotor E in opposition to the rotating driving rotor, the speed of said driven rotor, in reverse, depending upon the adjustment of the rod 53.

The rod 53 is fitted with a tug 83 (Fig. 1ª) having at its upper side a shoulder 84 and catch 85. A spring pressed stop-latch 86 pivoted on a stationary support 87 and releasable through a pull 88, supplies an abutment for the shoulder 84 and a latch for the catch 85 on the lug 83. Impingement of the shoulder 84 against the stop-latch 86 guards against the accidental pulling of the rod 53 so far that the filler segment 19 is completely extended. Such complete extension of said filler segment, with the driving rotor D in motion, would result in injury to the stator F wherein the power transmitting fluid would then be trapped. With the driving rotor D motionless, it is safe to completely extend the filler segment 19. This may be done by first elevating the stop-latch through the medium of the pull 88 and thereafter pulling upon the rod 53. Carried by said rod 53 to position of engagement with the stop-latch 86, the shoulder 84 secures the rod 53 in position keeping the filler segment 19 extended. Now, the shaft B may be freely turned for any of the various reasons that might arise in the employment of the device, such, for example as the moving of an automobile by outside power. In addition to the functions of the rod 53 hereinbefore explained, said rod may be employed to cause the braking of the driven rotor E. If the driving rotor D is motionless and the filler segment 19 fully retracted, it will be understood that the driven rotor E cannot be turned on account of the fluid lock in the stator F. A push upon the rod 53, therefore, will cause the braking of the driven rotor E when the driving rotor is not in motion. If the driving rotor is turning and the driven rotor E rotating in the same direction, a pull upon the rod 80 partially retracting the filler segment 19ª will slow down the speed of the driven rotor E proportionately to such retraction of said segment 19ª. Continuing the retraction of the filler segment 19ª by said rod 80, the driven rotor E is further slowed down to the point of being locked when said segment reaches position of complete retraction.

Changes in the specific form of my invention, as herein disclosed, may be made withing the scope of what is clamied without departing from the spirit of my invention.

Having described my invention, what I claim as new and desire to protect by Letters Patent is:

1. In a power transmitting device of the class described, a housing, drive and driven shafts aligned and journaled within said housing, a propelling rotor mounted on the drive shaft and formed with a fixed segmental protuberance at either side of the rim thereof, movable filler segments slidably seated in said rim and adapted to form continuations of said segmental protuberances, a stator fixed within said housing at one side of the propelling rotor, said stator being formed with an annular groove in the inner side of the rim thereof to slidably receive the segmental protuberance and movable filler segment on the adjacent side of the propelling rotor, spaced radial blades slidable in the rim of the stator, in the direction of the stator axis, to and from positions intercepting said groove, means for yieldingly urging said blades toward the groove and against the faces of said protuberance and movable segment, a driven rotor mounted on said driven shaft at the side of the propelling rotor opposite said stator, said driven rotor having an annular groove in the rim thereof to receive the adjacent protuberance and filler segment of the propelling rotor, also having yieldable radial blades similar to and arranged like those of the stator, said rim of the propelling rotor having a pair of ducts therein, one duct extending from one extremity and the second duct extending from the other extremity of the protuberance on one side of said propelling rotor to the corresponding extremities of the protuberance on the opposite side of the propelling rotor, a pair of shifter rings encircling said propelling rotor and slidably axially thereof within the housing, said rings being joined with said filler segments, independent means for severally shifting said rings, co-operating clutch members associated with said driven rotor and propelling rotor, and actuating means for said clutch members operable by the shifting means for one of said rings.

2. In a power transmitting device of the class described, a pair of axially aligned contacting rotors and a stator contacting with one of said rotors and axially aligned with respect thereto, one of each of the contacting elements being formed with a fluid receiving groove in its contacting face, a fixed filler segment and a movable filler segment complementing each groove and carried by the adjacent contacting element, ducts in the intermediate element affording circuitous communication between those portions of the two grooves, not occupied by the movable filler segments, an individual set of blades carried by each grooved element, each blade of each set being yieldingly slidable into its respective groove and against the faces of the fixed and movable filler segments therein, independent means for severally shifting said movable filler segments, clutch mechanisms including co-operating members associated with said rotors, and actuting means for one of said clutch members operable through the medium of the shifting means for one of the movable segments.

3. In a power transmitting device of the class described, a pair of axially aligned contacting rotors and a stator contacting with one of said rotors and axially aligned with respect thereto, one of each of the contacting elements being formed with a fluid receiving groove in its contacting face, a fixed filler segment and a movable filler segment complementing each groove and carried by the adjacent contacting element, ducts in the intermediate element affording circuitous communication between those portions of the two grooves, not occupied by the movable filler segments, an individual set of blades carried by each grooved element, each blade of each set being yieldingly slidable into its respective groove and against the faces of the fixed and movable filler segments therein, and means for shifting said movable filler segments.

4. In a power transmitting device of the class described, a pair of axially aligned contacting rotors and a stator contacting with one of said rotors and axially aligned with respect thereto, one of each of the contacting elements being formed with a fluid receiving groove in its contacting face, a fixed filler segment and a movable filler segment complementing each groove and carried by the adjacent contacting element, ducts in the intermediate element affording circuitous communication between those portions of the two grooves, not occupied by the movable filler segments, an individual set of blades carried by each grooved element, each blade of each set being yieldingly slidable into its respective groove and against the faces of the fixed and movable filler segments therein, and independent means for severally shifting said movable filler segments.

5. In a power transmitting device of the class described, a pair of axially aligned contacting rotors and a stator contacting with one of said rotors and axially aligned with respect thereto, one of each of the contacting elements being formed with a fluid receiving groove in its contacting face, a fixed filler segment and a movable filler segment complementing each groove and carried by the adjacent contacting element. ducts in the intermediate element affording circuitous communication between those portions of the two grooves not occupied by the movable filler segments, an individual set of blades carried by each grooved element, each blade of each set being yieldingly slidable into its respective groove and against the faces of the fixed and movable filler segments therein.

6. In a device of the class described, a driven rotor, a stator and a driving rotor interposed between the driven rotor and stator and co-operating with both to form an annularly shiftable chamber for fluid in the driven rotor and a similar chamber in the stator, said rotor having passageways therethrough affording communication between the adjacent ends of the shiftable chambers, adjustable filler segments at either side of the driving rotor for altering the capacity of said fluid chambers, and blades within the driven rotor and stator arranged to intercept the fluid chambers therein.

7. In a device of the class described, three main elements, consisting of a driven rotor, a stator and a driving rotor, said elements being disposed side by side, the intermediate and one of the other elements forming a co-operating pair having an annularly shiftable fluid chamber between them, said intermediate and the other element comprising a second pair of co-operating elements having an annularly shiftable fluid chamber between the same, said intermediate element being formed with passageways affording communication between adjacent ends of said chambers, an adjustable filler member carried by one element of the first pair and adapted to alter the capacity of the fluid chamber between the elements of said pair, and a second filler segment carried by one element of the second pair for altering the capacity of the fluid chamber between the elements of said pair, blades on one element of the first pair and blades on one element of the second pair, said blades being arranged to respectively intercept the fluid chambers formed by said paired elements.

8. In a device of the class described, three elements, viz; a driven rotor, a stator and a driving rotor, all having a common axis, the intermediate and one of the other elements forming a co-operating pair having an annularly shiftable fluid chamber between them, said intermediate and the other element comprising a second pair of co-operating elements having an annularly shiftable fluid chamber between the same, said intermediate element being formed with passageways affording communication between adjacent ends of said chambers, an adjustable filler member carried by one element of the first pair and adapted to alter the capacity of the fluid chamber between the elements of said pair, gates on one element of the first pair and gates on one element of the second pair, said gates being arranged to respectively intercept the fluid chambers formed by said paired elements.

9. In a device of the class described, three elements, viz; a driven rotor, a stator and a driving rotor, all having a common axis, the intermediate and one of the other elements forming a co-operating pair having an annularly shiftable fluid chamber between them, said intermediate and the other element comprising a second pair of co-operating elements having an annularly shiftable fluid chamber between the same, said intermediate element being formed with passageways affording communication between adjacent ends of said chambers, a segmental member carried by one element of the first pair and adjustable to alter the capacity of the fluid chamber between said element and its companion element, gates on said companion element co-operating with said segmental member and gates on one element of the second pair, said gates being arranged to respectively intercept the fluid chambers formed by said paired elements.

In testimony whereof, I have signed my name to this specification.

EDMUND B. LAMBERT.